US009948603B1

(12) United States Patent
Lee et al.

(10) Patent No.: US 9,948,603 B1
(45) Date of Patent: Apr. 17, 2018

(54) SYSTEM AND METHOD OF CONSTRUCTING DYNAMIC NAMESPACES IN THE INTERNET OF THINGS

(71) Applicant: Symantec Corporation, Mountain View, CA (US)

(72) Inventors: Eun Kyu Lee, Goyang (KR); Anand Kashyap, Los Altos, CA (US); Petros Efstathopoulos, Los Angeles, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 199 days.

(21) Appl. No.: 14/747,906

(22) Filed: Jun. 23, 2015

(51) Int. Cl.
G06F 15/173 (2006.01)
H04L 29/12 (2006.01)
H04L 29/08 (2006.01)

(52) U.S. Cl.
CPC .......... *H04L 61/3015* (2013.01); *H04L 61/10* (2013.01); *H04L 61/609* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 5,377,323 A | * | 12/1994 | Vasudevan | G06F 9/46 707/999.01 |
| 5,991,810 A | * | 11/1999 | Shapiro | G06F 21/31 707/999.001 |
| 6,119,171 A | * | 9/2000 | Alkhatib | H04L 29/06 370/390 |
| 2010/0174746 A1 | * | 7/2010 | Sidman | G06F 17/3089 707/771 |
| 2012/0042006 A1 | * | 2/2012 | Kiley | G06F 17/30867 709/203 |
| 2012/0166610 A1 | * | 6/2012 | Doh | H04L 67/12 709/223 |
| 2013/0223744 A1 | * | 8/2013 | Ramanujapuram | G06F 17/30247 382/182 |
| 2014/0244710 A1 | * | 8/2014 | Sharma | H04L 67/12 709/201 |
| 2014/0359131 A1 | * | 12/2014 | Seed | H04L 47/125 709/226 |

(Continued)

OTHER PUBLICATIONS

European Research Cluster on the Internet of Things (IERC) at http://www.internet-of-things-research.eu/index.html; Date unknown, but believed to be at least as early as Jun. 23, 2015.

(Continued)

*Primary Examiner* — Phyllis A Book
(74) *Attorney, Agent, or Firm* — Maschoff Brennan (57) ABSTRACT

A method, performed by a network device, for communication with Internet of Things (IoT) devices is provided. The method includes receiving a communication relevant to Internet of Things devices, wherein the communication is in accordance with a naming scheme that has conventions for objects, context, data and commands and is agnostic as to a plurality of addressing schemes of the Internet of Things devices. The method includes resolving names in the communication, in accordance with the naming scheme, and sending the communication or a further communication to one or more Internet of Things devices per the resolving.

20 Claims, 5 Drawing Sheets

(56) References Cited

U.S. PATENT DOCUMENTS

| | | | |
|---|---|---|---|
| 2015/0019710 A1* | 1/2015 | Shaashua | G06F 17/30705 709/224 |
| 2015/0130957 A1* | 5/2015 | Berelejis | H04L 67/12 348/211.1 |
| 2015/0227618 A1* | 8/2015 | Dong | G06F 17/2785 707/736 |
| 2015/0312311 A1* | 10/2015 | Subramanian | G06F 17/3051 709/223 |
| 2016/0028605 A1* | 1/2016 | Gil | H04W 4/006 709/213 |
| 2016/0048114 A1* | 2/2016 | Matthieu | G05B 15/02 700/83 |
| 2016/0344841 A1* | 11/2016 | Wang | H04W 4/005 |
| 2017/0034041 A1* | 2/2017 | Carofiglio | H04L 45/122 |
| 2017/0043255 A1* | 2/2017 | Savolainen | A63F 13/65 |
| 2017/0139996 A1* | 5/2017 | Marquardt | G06F 17/30477 |
| 2017/0199873 A1* | 7/2017 | Barthel | G06F 17/30038 |

OTHER PUBLICATIONS

Named-Data Networking (NDN) at http://named-data.net/; Date unknown, but believed to be at least as early as Jun. 23, 2015.
MobilityFirst as http://mobilityfirst.winlab.rutgers,edu/; Date Unknown, but believed to be at least as early as Jun. 23, 2015.
IERC Activity Chain 2, Deliverable D1, "Catalogue of IoT Naming, Addressing and Discovery Schemes in IERC Projects", IERC-AC2-D1 v1.7, Oct. 2013.

* cited by examiner

FIG. 1

202 — Objects
- Devices (/Devices/Projector1, /Devices/Projectors/1)
- Users (/Users/John Smith, /Users/IT)

204 — Context
- Time (Time/Now, /Time/2015/04/16/11)
- Location (/loc/Here, /loc/Symantec/ Culver City)

206 — Data (/Devices/Camera/Data/Frame2/1)

208 — Commands (/Devices/Projector1/Commands/Switch_On)

210 — Iot://[Object:Pass@Context](Object/Context/Data/Command)*

FIG. 2

An Application for Lighting Control

- Turn Off a Light in a Particular Office
302 — Iot://loc/Mtv/R/Johns_Office/Devices/Lights/Commands/Switch_Off

- Turn Off All Lights in Building R in Mountain View
304 — Iot://loc/Mtv/R/Devices/All_Lights/Commands/Switch_Off

- Turn Off All Lights in Mountain View at 8pm Tonight
306 — Iot://loc/Mtv/Time/Today/20/Devices/All_Lights/Switch_Off

- Use Admin Privileges to Issue the Command to Turn Off Lights
308 — Iot://[/Users/IT/Admin/John@/Time/Now]/loc/Mtv/Devices/All_Lights/Commands/Switch_Off

- A Command to Turn Off Lights Fails as it was Issued More Than 24 Hours Ago
310 — Iot://[/Users/IT/Admin/John@/Time/2015/4/15/12]/loc/Mtv/Time/Today/20/Devices/All_Lights/Commands/Switch_Off

FIG. 3A

An Application for Data Acquisition

- Get Current Temperature Reading from a Single Temperature Sensor
  312 — • Iot://Location/Cul/Flr1/Warroom/Devices/Temp_Sensor/Data/Temp/Time/Now

- Get Average of All Temperature Readings from Multiple Sensors in Culver City
  314 — • Iot://Location/Cul/Devices/All_Temp_Sensors/Data/Temp/Data/Avg

- Get Yesterday's Aggregate Temperature From All Sensors in Culver City
  316 — • Iot:// Location/Cul/Devices/All_Temp_Sensors/Data/Temp/Time/Yesterday/Data/Avg
  318 — • Iot://Time/Yesterday/Data/Avg/Data/Temp/Location/Cul

Aggregation of Data or Devices or Users is Built in

- /Devices/All Lights Resolves to /Devices/Light1, /Devices/Light2, Etc.

- Data can be Aggregated Using Operators Such as 'Sum', 'Avg', Etc.

- Data can be Aggregated Across Multiple Dimensions Simultaneously, E.g., Time, Location, Type of Devices, Type of Users, Etc.

322  324

Hierarchical Naming Scheme Enables Filtering, Routing, and Processing of Data Efficiently

326 E.g., a Query to Turn Off a Light in MTV Office Gets Routed Only to that Light's Controller as Intermediate Routers Forward the Request Only if Required   328

Access Control is Built in

- The Context of the Object Requesting a Data or Service can be Obtained Automatically, and Policies can be Used for Access Control

- E.g, a User in Culver City can't Turn Off a Light in MTV Because his Request are Like
  330 — • Iot://[/Users/John@/Loc/Cul]/Devices/Light1/Command/Switch_Off

SYSTEM AND METHOD OF CONSTRUCTING DYNAMIC NAMESPACES IN THE INTERNET OF THINGS

BACKGROUND

The Internet of Things (IoT) system shows a heterogeneous nature. Internet of Things devices are of dissimilar types and are connected via various wireless communications technologies like WiFi, ZigBee, Z-Wave, etc., or by various wired communications technologies. It is expected that tens of billions of heterogeneous Internet of Things devices will be deployed in the future. These properties distinguish the Internet of Things system from the Internet system so that existing device management schemes cannot be directly applied to the emerging network setting. In a conventional IT (Internet Technology) system such as web services, a device (e.g., a computer server) is identified based on its domain name or IP (Internet Protocol) address. A user discovers services or data of interest using the identifier of a hosting device and authenticates the host using a certificate for trust establishment. This is known as a host-based approach. The success of the host-based approach is primarily attributed to a standardized IP-based addressing scheme and a globally unique naming system (i.e., DNS or Domain Name System) based on IP addresses.

However, many communications technologies in the Internet of Things do not support an IP-based addressing scheme, and thus many Internet of Things devices cannot be uniquely identified by IP addresses. It is not possible to reuse the existing IP address-based naming system directly for all devices in the Internet of Things. Moreover, due to the heterogeneous nature, it is not possible that all the communications technologies have a single addressing and naming scheme. The mobile nature in the Internet of Things brings another challenging issue that prevents the host-based approach using IP address from being applied to the Internet of Things environment. Many Internet of Things devices are easily installed and uninstalled to physical objects. Mobile users frequently approach to the Internet of Things devices, systematically speaking, and they join and leave existing Internet of Things networks randomly and frequently. In this setting, it is inefficient to assign IP addresses and to name the devices and users whenever they move around.

It is within this context that the embodiments arise.

SUMMARY

In some embodiments, a method, performed by a network device, for communication with Internet of Things (IoT) devices is provided. The method includes receiving a communication relevant to Internet of Things devices, wherein the communication is in accordance with a naming scheme that has conventions for objects, context, data and commands and is agnostic as to a plurality of addressing schemes of the Internet of Things devices. The method includes resolving names in the communication, in accordance with the naming scheme, and sending the communication or a further communication to one or more Internet of Things devices per the resolving.

In some embodiments, a tangible, non-transitory, computer-readable media having instructions thereupon which, when executed by a processor, cause the processor to perform a method is provided. The method includes receiving a communication regarding one or more Internet of Things objects, data or commands, the communication conforming to an Internet of Things naming scheme having dynamic conventions for objects, context, data and commands and having agnosticism regarding addressing schemes of devices. The method includes determining one or more Internet of Things devices with which to communicate, based on the one or more objects, data or commands referenced in the communication and communicating with or accessing the one or more Internet of Things devices in accordance with the determining.

In some embodiments, a network device is provided. The device includes one or more network ports configured to couple to one or more networks or devices. The device includes one or more processors, configured to receive or transmit communications that are according to an Internet of Things naming scheme that is agnostic of addressing schemes of the Internet of Things devices and has dynamic conventions for objects, context, data and commands. The device includes a name resolution module, configured to resolve names in, and identify one or more Internet of Things devices based on, a communication in accordance with the Internet of Things naming scheme. The one or more processors are configured to access or communicate with the one or more Internet of Things devices identified by the name resolution module, via the one or more network ports.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The embodiments present a naming scheme in the Internet of Things. Users, applications and devices are able to discover Internet of Things data, services and devices using context-based names instead of a host identifier such as an IP (Internet protocol) address or a domain name. The Internet of Things naming scheme has a dynamic namespace and is agnostic as to addressing schemes of Internet of Things devices. Particularly, the naming scheme is applicable whether or not an Internet of Things device has an IP address or a domain name or support for these mechanisms. Strings used in communications involving Internet of Things devices, data and this naming scheme can have one or more of the following four facets: location, time, object, and command. Conventions for each of these, and examples of types, strings, usage and devices are described below.

Figure 1:
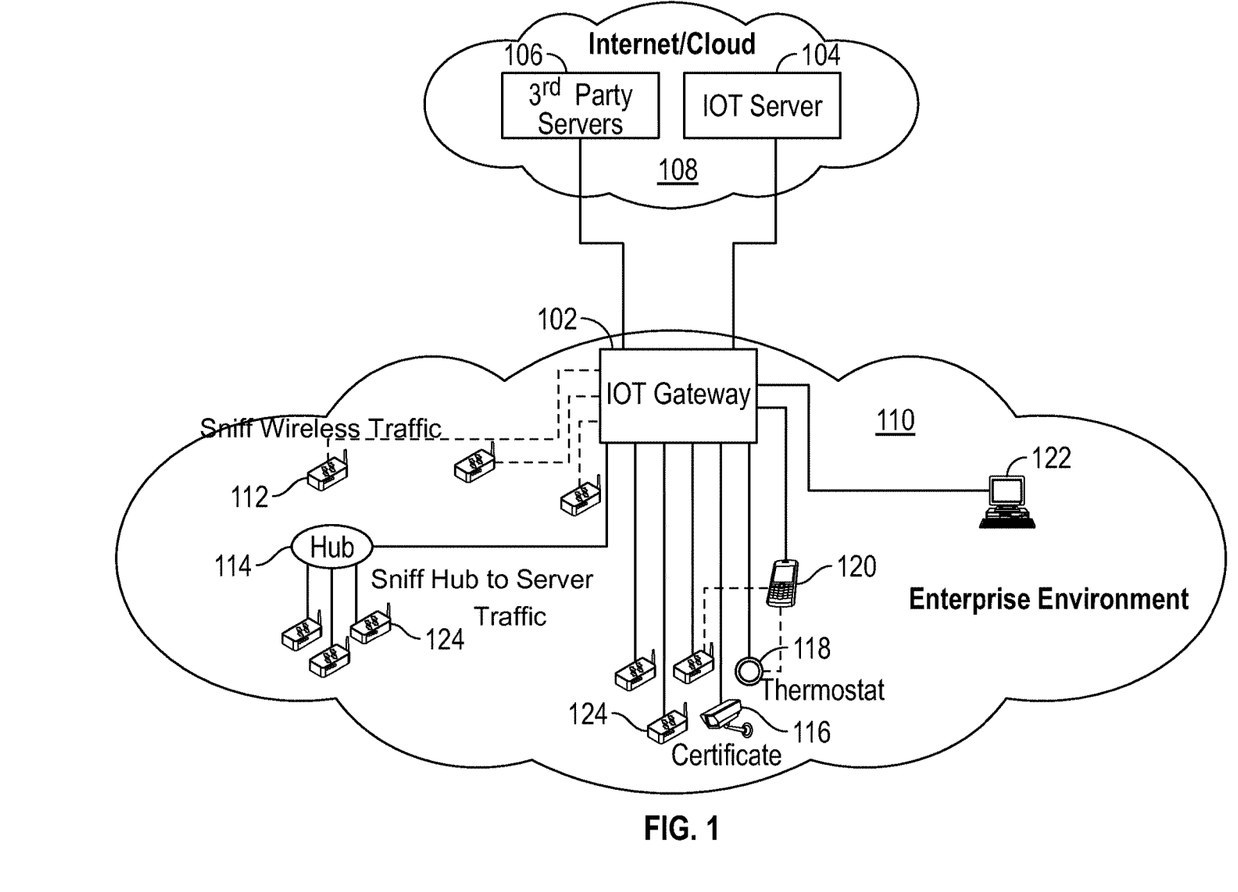
FIG. 1 depicts an Internet of Things gateway device communicating with one or more Internet of Things devices in accordance with some embodiments.

FIG. 1 depicts an Internet of Things gateway device 102 communicating with one or more Internet of Things devices 112, 114, 116, 118, 120, and 122. These could include wireless devices 112 such as wireless routers, a hub 114, wired devices 124 (which could also have wireless ports, e.g., a wireless router connected by wire to the Internet of Things gateway device 102), a certificate repository 116, a smart thermostat 118, a smart phone 120, a computer 122, and various further user devices, mobile devices or installed devices. Here, the Internet of Things gateway device 102 and the Internet of Things devices 112, 114, 116, 118, 120, 122 are coupled together by a network 110 in an enterprise environment, although further examples of other environments and topologies for connection are readily devised (see FIG. 5). Also, the Internet of Things gateway device 102 is coupled to another network 108, such as the Internet or the Cloud, and thereby is coupled to an Internet of Things server 104 and various third-party servers 106. Even though the Internet of Things gateway device 102 and the Internet of Things devices 112, 114, 116, 118, 120, 122 do not necessarily all have IP addresses or domain names or ability to support IP addresses or domain names, they are able to communicate amongst one another, and access one another, and users are able to issue commands and obtain data from them by using communication strings in accordance with the Internet of Things naming scheme. The namespace for the Internet of Things is dynamic, and can be modified or added to in a flexible manner.

Figure 2:
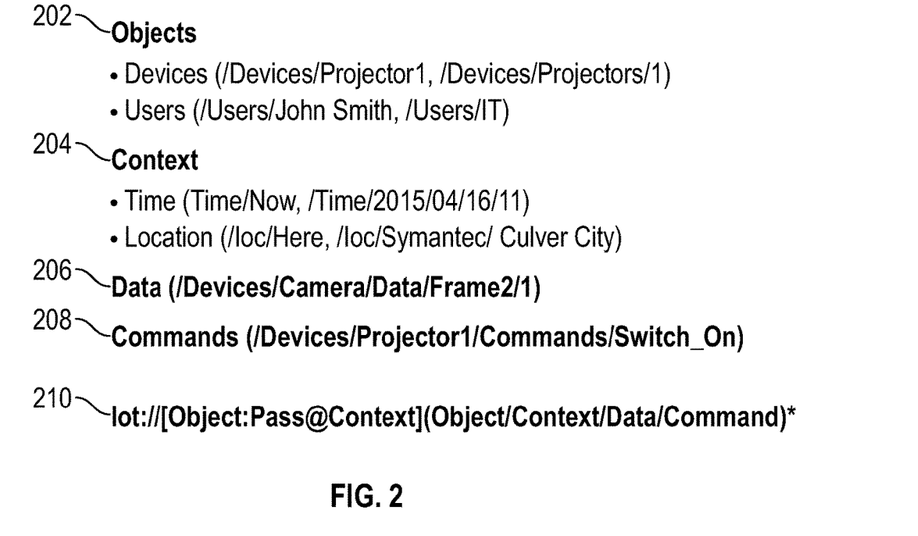
FIG. 2 shows examples of objects, context, data and commands that are named in an Internet of Things naming scheme in accordance with some embodiments.

FIG. 2 shows examples of objects 202, context 204, data 206 and commands 208 that are named in an Internet of Things naming scheme in accordance with the embodiments. Each of these facets in the Internet of Things naming scheme has conventions in the Internet of Things naming scheme, as illustrated in these examples, which answer the question of "what gets named?" Objects 202 can be devices or users. Further objects 202 and more types of objects 202 can be added to the Internet of Things naming scheme. In the example provided by FIG. 2, a projector, named "projector1", is one device, with example syntax "/devices/projector1" or "/devices/projectors/1". An example user is named John Smith, with example syntax "/users/john_smith" for a user identified by name, or "/users/IT" for a user identified by membership to a group such as Information Technology. Objects 202 in a string are identified by the namespace keyword for a type of object, and the name of the object 202 in some embodiments. Context 204 can be time or location in some embodiments. Further contexts or types of context can be added to the Internet of Things naming scheme. FIG. 2 shows an example of two types of time, namely a relative time such as "now" (i.e., the present as referenced by a string), and an absolute time such as "11 AM on Apr. 16, 2015", with respective example syntaxes "/time/now" and "/time/2015/04/16/11". Example locations are "here" (i.e., the present location as referenced by a string) and "Culver City, Calif.", with example syntax "/loc/here" and "/loc/symantec/culver_city". A context 204 in a string is identified by the namespace keyword for a type of context, and the name of the context 204.

Data 206 can be identified in and of itself or can be identified relative to a device, a location or a time. For example, data that can be identified in and of itself could include a title of an article, book, song or movie, a title of an episode of a television program or a scene from a movie or a program. Data identified by a location and time could include traffic data for a roadway on a specific date and time, or data from a specific bank or other commercial establishment or home on a specific date or span of time, etc. Further data 206, types of data 206 or naming conventions for data 206 can be added to the Internet of Things naming scheme. FIG. 2 shows an example of data 206 from a camera (i.e., a specific device) and a specific frame, "frame 2, scene 1", with example syntax "/devices/camera/data/frame2/1". Data 206 in a string is identified by the namespace keyword for data, or a type of data, and the name of the data 206.

Still referring to FIG. 2, commands 208 can be identified by keywords. Further commands 208 or types of commands 208, and associated keywords, can be added to the Internet of Things naming scheme. FIG. 2 shows an example of a command 208, to turn on a device, in this example a projector with a name "projector 1" and example syntax "/devices/projector1/commands/SWITCH_ON". A command 208 in a string is identified by the namespace keyword "commands" or "command" and the name or keyword of the command 208.

FIG. 2 further illustrates an example of the general syntax of an Internet of Things naming scheme string 210. A string, such as string 210, could be written by a user, an application or a device, and sent through a network to one or more devices, e.g., as a message or other communication. The general syntax is iot://[object:pass@context] (object/context/data/command)*, or variations thereof. This syntax identifies the string as an Internet of Things string, which could have an object such as a device or a user with a password relative to a context, and which could have one or more of an object, a context, a data and/or a command. Multiple objects and multiple types of objects, multiple contexts and multiple types of contexts, multiple data or types of data, and multiple commands or types of commands are possible in a string. It should be appreciated that that the multiple objects, contexts, data, commands can also occur in any order in the name string.

Figure 3A:
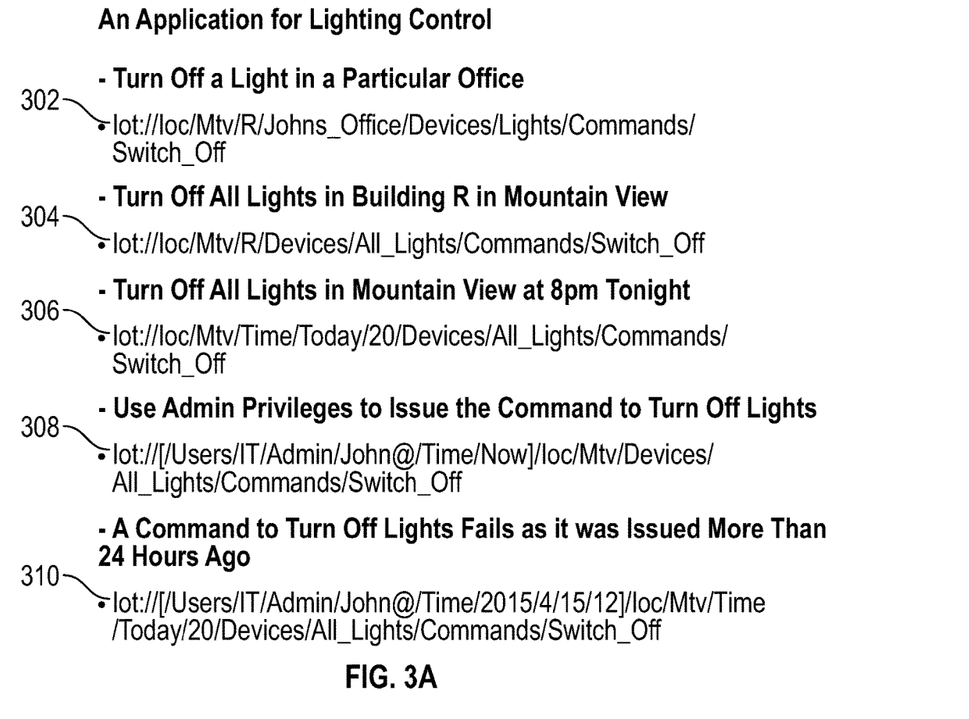
FIG. 3A shows examples of strings suitable for use in communications in accordance with the Internet of Things naming scheme in accordance with some embodiments.

FIG. 3A shows examples of strings suitable for use in communications in accordance with the Internet of Things naming scheme. In an application for lighting control, a light could be turned off in a particular office, using the first example string 302, "iot://loc/mtv/R/johns_office/devices/lights/commands/SWITCH_OFF". This example string 302 specifies a location of Mountain View, Calif., Building R, the office of a man named John, a device that is one or more lights, and a command to switch off the named device. All of the lights in Building R in Mountain View could be turned off, using the second example string 304, "iot://loc/mtv/R/devices/all_lights/commands/SWITCH_OFF". This example string 304 specifies a location of Mountain View, Calif., Building R, a device that is all of the lights (e.g., of the entire building), and a command to switch off the named device. Adding a time as a context to the string results in execution of the command at the specified time. The third example string 306 turns off all of the lights in the entire town of Mountain View at 8 PM (e.g., "20" on a 24-hour clock) tonight, i.e., the present day or today, with the syntax, "iot://loc/mtv/time/today/20/devices/all_lights/commands/ SWITCH_OFF". Adding administrative privileges to the string is shown in the fourth example string 308, with the syntax of, "iot://[/users/IT/admin/John@/time/2015/4/15/ 12]/loc/mtv/time/today/20/devices/all_lights/commands/ SWITCH_OFF". A failed command is shown in the fifth example string 310, in which the command to turn off lights fails as it was issued more than 24 hours previously, with the syntax, "iot://[/users/IT/admin/John@/time/2015/4/15/12]/ loc/mtv/time/today/20/devices/all_lights/commands/SWI- TCH_OFF".

Figure 3B:
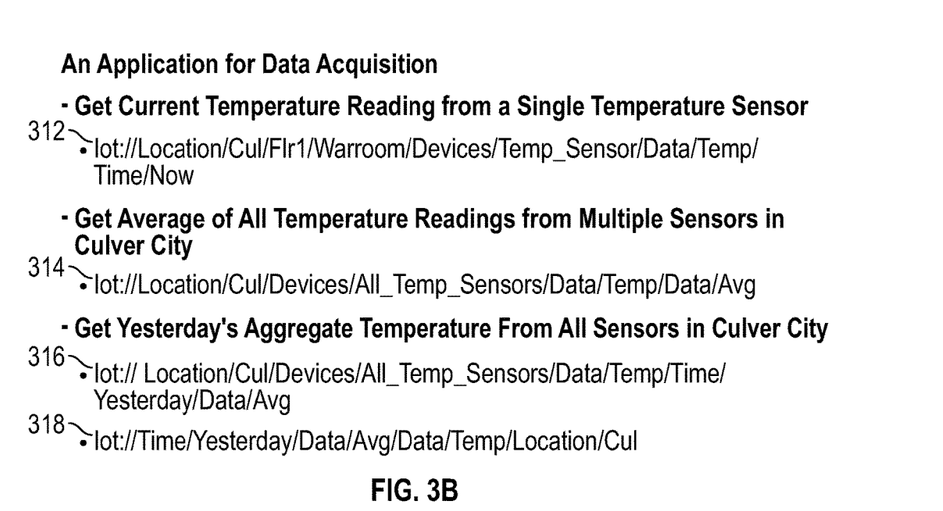
FIG. 3B shows further examples of strings suitable for use in communications in accordance with the Internet of Things naming scheme in accordance with some embodiments.

FIG. 3B shows further examples of strings suitable for use in communications in accordance with the Internet of Things naming scheme. In an application for data acquisition, a current temperature reading could be obtained from a single temperature sensor, with the first example string 312, "iot:// location/cul/flr1/warroom/devices/temp_sensor/data/temp/ time/now". This example string 312 specifies a location of Culver City, Calif., first floor, the war room, and a device that is a temperature sensor, with temperature data to be obtained at the present time, e.g., "now". The second example string 314 of FIG. 3B obtains an average of all temperature readings from multiple sensors in Culver City, Calif., with a syntax of, "iot://location/cul/devices/ all_temp_sensors/data/temp/data/avg". This uses both device aggregation and data aggregation. Aggregate tem- perature from all sensors in Culver City, Calif. from the previous day (e.g., the relative time of "yesterday") is obtained using the third example string 316, "iot://location/ cul/devices/all_temp_sensors/data/temp/time/yesterday/ data/avg" or the fourth example string 318, "iot://time/ yesterday/data/avg/data/temp/location/cul".

Figure 3C:
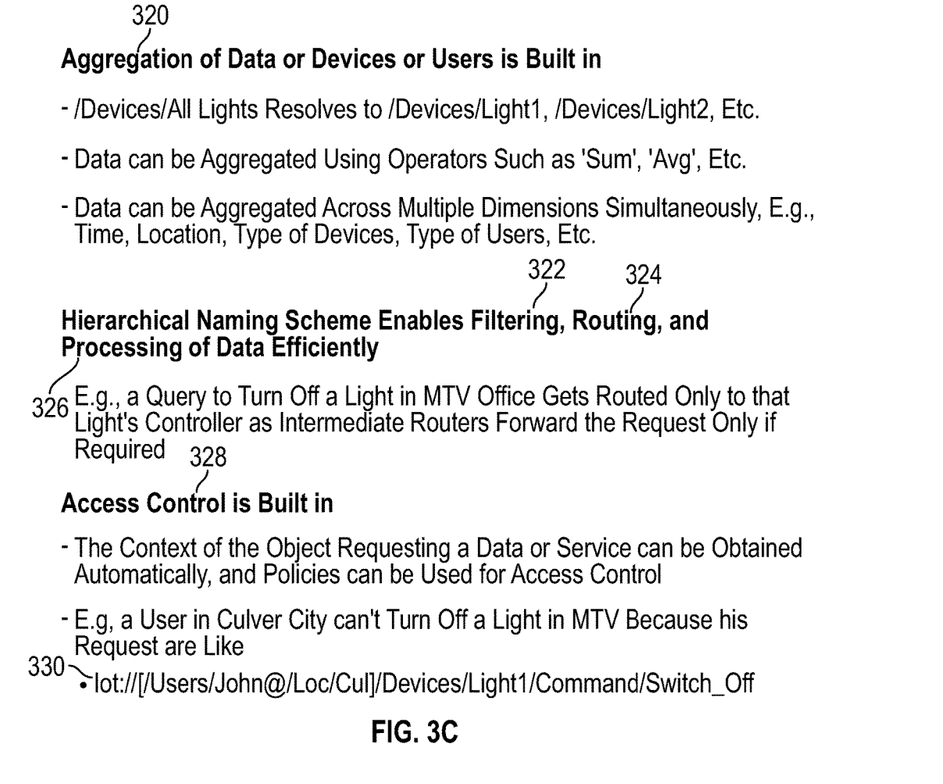
FIG. 3C shows further examples of strings suitable for use in communications in accordance with the Internet of Things naming scheme in accordance with some embodiments.

FIG. 3C shows further examples of strings suitable for use in communications in accordance with the Internet of Things naming scheme. Aggregation 320 of data or devices is built in to the naming scheme and can be expressed in a string. The first example in FIG. 3C shows that the syntax in a name string of "/devices/all_lights" resolves to "/devices/light 1", "/devices/light 2" and so on, as multiple devices (lights, in this case) are aggregated into the device name "all_lights". Further examples of device aggregation are readily devised. Data can be aggregated, using operators such as "sum" (e.g., to add data), "avg" (e.g., to average data), "filter" (e.g., with various parameters), "plot" (e.g., to show in graphical form), or other operators as readily devised. Data can be aggregated across multiple dimensions, such as time, location, type of devices, type of users, etc. A hierarchical naming scheme enables filtering 322, routing 324 and processing 326 of data efficiently. For example, a query to turn off a light in a specific office in Mountain View gets routed only to a specific controller of the specific light, as intermediate routers forward the request only if required. Access control 328 is built into the Internet of Things naming scheme. The context of the object requesting a specified data or service can be obtained automatically, and policies can be used for access control. For example, a user in Culver City Calif. cannot turn off a light in Mountain View with a request using the example string 330, "iot://[/users/John@/loc/cul]/de- vices/light1/command/SWITCH_OFF".

Figure 4:
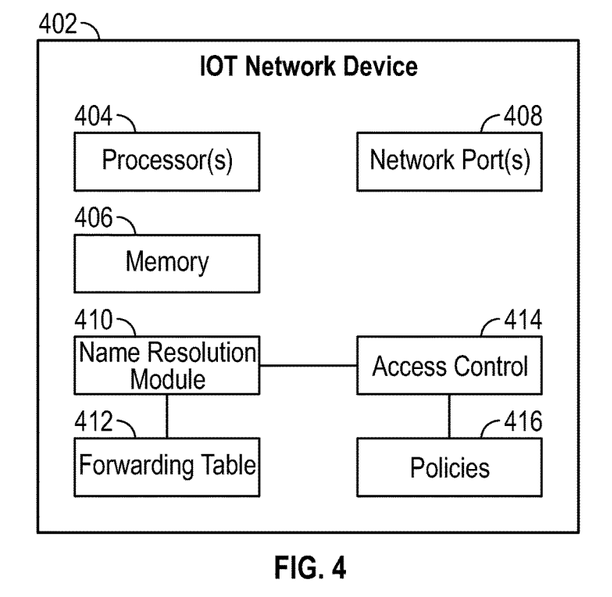
FIG. 4 is a block diagram of an Internet of Things network device in accordance with some embodiments.

FIG. 4 is a block diagram of an Internet of Things network device 402. This could be, for example, a router, a gateway device, a network switch, a hub, a virtual machine imple- mented with physical computing resources, a device local to an intranet, a distributed device across a network, a server, etc. In this example, the Internet of Things network device 402 has one or more processors 404, memory 406, one or more network ports 408, a name resolution module 410, a forwarding table 412, and access control module 414, and a policies repository 416. Each network port 408 can couple to a network and/or to one or more network-connectable devices. In variations, an Internet of Things network device 402 could have some or various combinations of these modules or components, other types of ports, or other components, or some of these components could be distrib- uted elsewhere but coupled to the device, etc. Various components could be implemented in software executing on the one or more processors 404, in firmware or hardware, or various combinations thereof.

Continuing with FIG. 4, the name resolution module 410 resolves one or more names in an Internet of Things string, determining to which Internet of Things device or devices to send a communication or otherwise access. This could include or be coupled to a discovery process, which could be local or distributed. For example, the name resolution mod- ule 410, or one or more processors 404, or an external process, could discover Internet of Things devices coupled (directly or through further devices) to the network port(s) 408 of the Internet of Things network device 402. The discovery process could be extended external to the network 110 of the local environment of the Internet of Things network device 402, in some embodiments. Once a name is resolved, the Internet of Things network device 402 adds the name and any associated information to the forwarding table 412, which could be implemented as a data structure, for example in the memory 406. Information that could be stored in association with a resolved name could include connection information, identifying information, address information, protocol information, etc. For example, a name that is resolved to a device that has an IP address or a domain name could have that IP address or domain name stored with the resolved name in the forwarding table 412. A name that is resolved to a device that has Bluetooth connectivity but no IP address and no domain name could have Bluetooth connectivity information stored along with the resolved name in the forwarding table 412 in some embodiments. A name that is resolved to a device with some other form of network connection, wireless connection or hardwired con- nection could have such connectivity information stored along with the resolved name in the forwarding table 412 in some embodiments. The name resolution module 410 is able to resolve a name to a device in a manner that is agnostic as to the addressing schemes of devices, i.e., that is indepen- dent of which type of addressing scheme or connectivity a device may have and that supports many different address- ing schemes or connectivity schemes. The forwarding table 412 is thus used in accessing or communicating with Inter- net of Things devices or data identified by the name reso- lution module 410.

The access control module 414 cooperates with the name resolution module 410, and controls access to Internet of Things devices and data in accordance with one or more policies in the policies repository 416. This is based on the context 204 of the object 202 as discussed with reference to FIG. 2. For example, the name resolution module 410 could determine which Internet of Things device(s) is referenced by a named object 202, or is applicable for a specified data 206 or command 208, and could determine a time or location either explicitly in a string or implied by an object 202, data 206 or command 208. The access control module 404 could then determine whether access to the referenced or inferred device or devices or data is allowed by one or more policies in the policies repository 416. In a string where a user and password are specified, this could be checked against a policy. Referring to the example string 308 of FIG. 3A, membership of a specified user to a specified group or set of users (e.g., IT, or admin) and/or use of a password can be applied by the access control module 404 in determining authorization.

Figure 5:
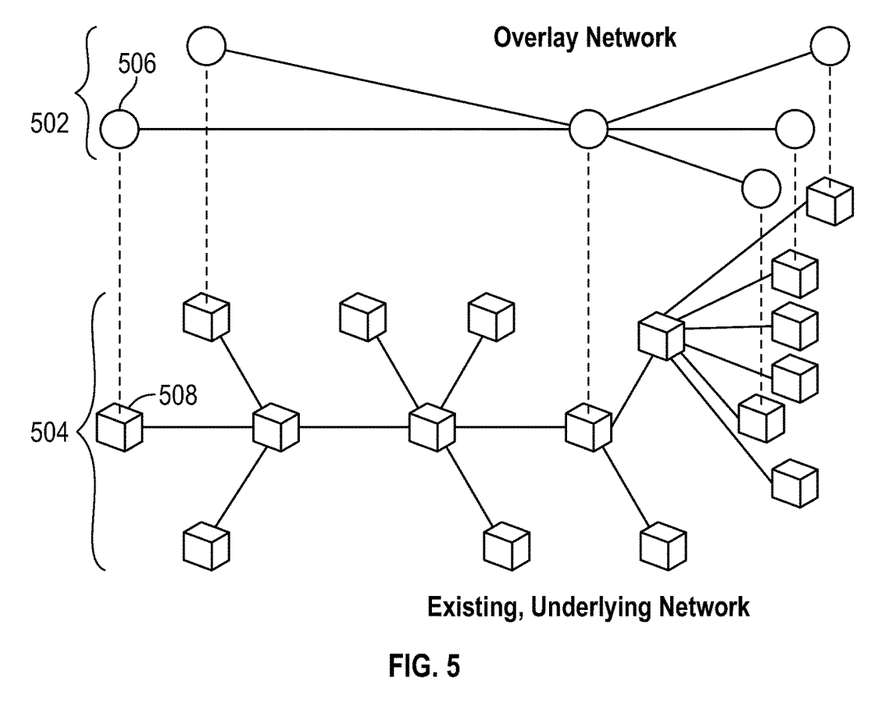
FIG. 5 depicts an overlay network suitable for distributing communications in accordance with the Internet of Things naming scheme in accordance with some embodiments.

FIG. 5 depicts an overlay network 502 suitable for distributing communications in accordance with the Internet of Things naming scheme. Generally, an overlay network 502 is defined or constructed on top of or using an existing, underlying network 504. That is, the existing network 504 has various nodes and connections, which the overlay network 502 reuses in the new, overlay topology. A node 506 in an overlay network 502 may be mapped to a node 508 in an underlying network 504. Examples of overlay networks 502 include virtual private networks (VPNs), VoIP (Voice over Internet Protocol), peer-to-peer networks, portions of the Internet built on top of the telephone network, portions of the telephone network built on top of the Internet, etc. In a related manner, an Internet of Things network, using the Internet of Things naming scheme, could be integrated with Named Data Networking (NDN) and/or distributed over an overlay network 502, e.g., built on top of the Internet.

Figure 6:
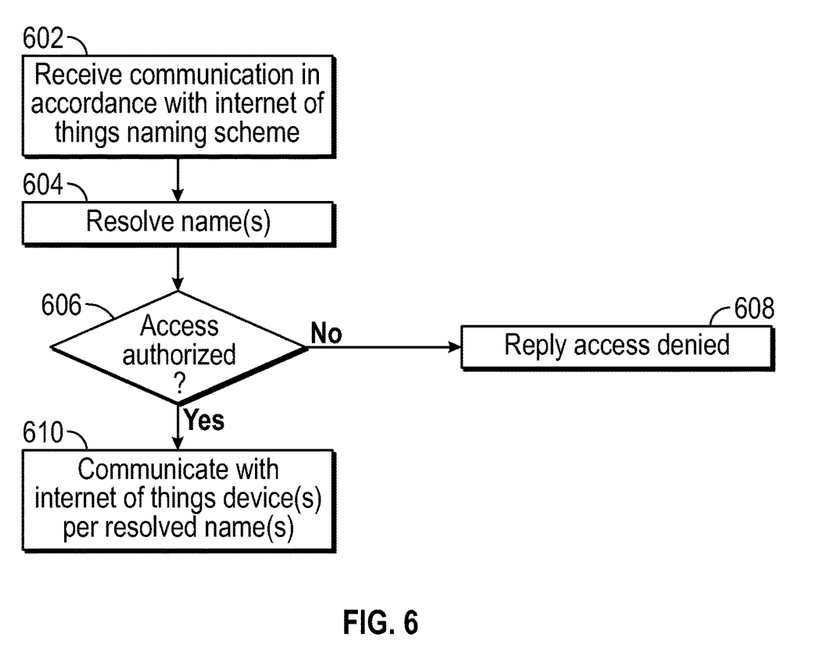
FIG. 6 is a flow diagram of a method for communication with Internet of Things devices, using the Internet of Things naming scheme in accordance with some embodiments.

FIG. 6 is a flow diagram of a method for communication with Internet of Things devices, using the Internet of Things naming scheme. The method can be practiced on or by an Internet of Things device, more specifically by one or more processors of an Internet of Things device. In an action 602, a communication in accordance with an Internet of Things naming scheme is received. The naming scheme has various conventions as described above, and the communication could include one or more objects, data, contexts or commands. In an action 604, one or more names are resolved from the communication. These could be names of one or more users, names of one or more devices, names of one or more pieces or types of data, names of one or more times or locations or other contexts, and/or names of one or more commands. Based on the resolved names, in a decision action 606, it is determined whether access is authorized. This could be in accordance with various policies. If the answer to the decision action 606 is no, access is not authorized, flow branches to the action 608. If the answer to the decision action 606 is yes, access is authorized, flow branches to the action 610. In the action 608, there is a reply that access is denied. In variations, there could be no reply, or some other reply could be given, or some other action could be taken. Flow then terminates, or proceeds elsewhere, for example back to the action 602 for more communication. In the action 610, there is communication with one or more Internet of Things per the resolved name or names. Flow could terminate or proceed accordingly.

Figure 7:
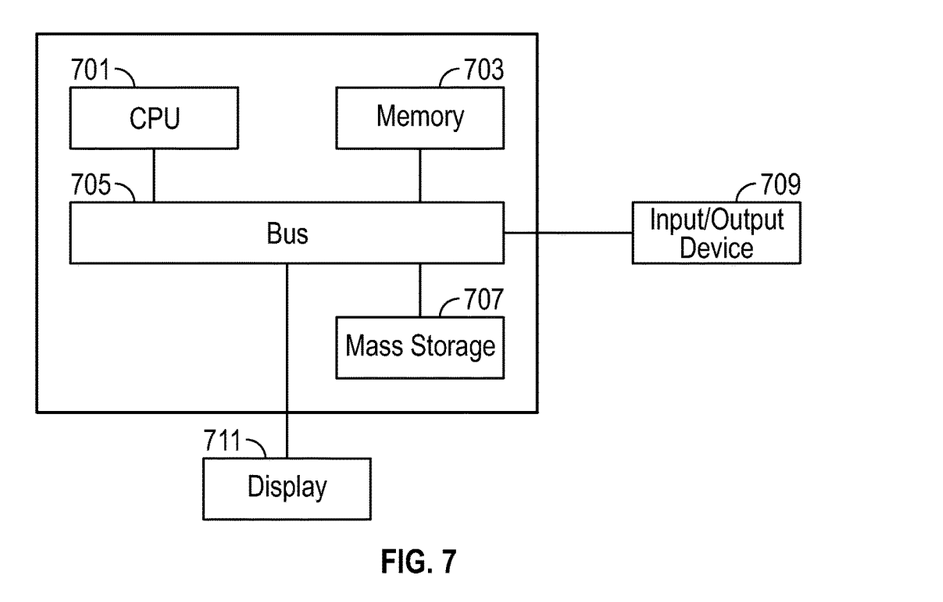
FIG. 7 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments described herein. The computing device of FIG. 7 may be used to perform embodiments of the functionality for communication and access to and from Internet of Things devices, using an Internet of Things name space and naming scheme in accordance with some embodiments. The computing device includes a central processing unit (CPU) 701, which is coupled through a bus 705 to a memory 703, and mass storage device 707. Mass storage device 707 represents a persistent data storage device such as a floppy disc drive or a fixed disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein to enable the functionality described with reference to FIGS. 1-6. The code embodying this functionality may be stored within memory 703 or mass storage device 707 for execution by a processor such as CPU 701 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, performed by an Internet of Things (IoT) gateway device, for communication with IoT devices coupled thereto, the method comprising:
   receiving an IoT communication string, the IoT communication string excluding a unique identifier for any of the IoT devices, the IoT communication string including the following context-based keyword/name pairs:
      a device or user keyword followed by a device or user name;
      a location or time keyword followed by a location or time name; and
      a data or command keyword followed by a data or command name;
   resolving the keyword/name pairs in the IoT communication string to determine which IoT device is specified by the names in the IoT communication string and which data or command is specified in the IoT communication string; and communicating with the specified IoT device to request the specified data from the specified IoT device or to send the specified command to the specified IoT device.

2. The method of claim 1, wherein:
the IoT communication string includes the user keyword followed by the user name;
the method further comprises identifying the user that corresponds to the user name; and
prior to the communicating, the method further comprises determining that the identified user is authorized to request the specified data from the specified IoT device or to send the specified command to the specified IoT device.

3. The method of claim 1, wherein the IoT communication string excludes an Internet Protocol (IP) address or a domain name as the unique identifier for any of the IoT devices.

4. The method of claim 1, wherein the IoT communication string further includes an identifier that identifies the IoT communication string as a communication string configured for communication with the IoT devices.

5. The method of claim 4, wherein the identifier comprises an "iot://" label.

6. The method of claim 1, wherein:
the device keyword is a "devices" label or the user keyword is a "users" label;
the location keyword is a "loc" label or the time keyword is a "time" label; and
the data keyword is a "data" keyword or the command keyword is a "commands" label.

7. A tangible, non-transitory, computer-readable media having instructions thereupon which, when executed by a processor of an Internet of Things (IoT) gateway device coupled to IoT devices, cause the processor to perform a method comprising:
receiving an (IoT) communication string, the IoT communication string excluding a unique identifier for any of the IoT devices, the IoT communication string including the following context-based keyword/name pairs:
a device or user keyword followed by a device or user name;
a location or time keyword followed by a location or time name; and
a data or command keyword followed by a data or command name;
resolving the keyword/name pairs in the IoT communication string to determine which IoT device is specified by the names in the IoT communication string and which data or command is specified in the IoT communication string; and
communicating with the specified IoT device to request the specified data from the specified IoT device or to send the specified command to the specified IoT device.

8. The computer-readable media of claim 7, wherein the IoT communication string excludes an Internet Protocol (IP) address or a domain name as the unique identifier for any of the IoT devices.

9. The computer-readable media of claim 7, wherein the IoT communication string further includes an identifier that identifies the IoT communication string as a communication string configured for communication with the IoT devices.

10. The computer-readable media of claim 9, wherein the identifier comprises an "iot://" label.

11. The computer-readable media of claim 7, wherein:
the device keyword is a "devices" label or the user keyword is a "users" label;
the location keyword is a "loc" label or the time keyword is a "time" label; and
the data keyword is a "data" keyword or the command keyword is a "commands" label.

12. The computer-readable media of claim 7, wherein:
the IoT communication string includes the user keyword followed by the user name;
the method further comprises identifying the user that corresponds to the user name; and
prior to the communicating, the method further comprises determining that the identified user is authorized to request the specified data from the specified IoT device or to send the specified command to the specified IoT device.

13. An Internet of Things (IoT) gateway device, comprising:
one or more network ports configured to couple to one or more (IoT) devices;
one or more processors configured to:
receive an (IoT) communication string, the IoT communication string excluding a unique identifier for any of the IoT devices, the IoT communication string including the following context-based keyword/name pairs:
a device or user keyword followed by a device or user name;
a location or time keyword followed by a location or time name; and
a data or command keyword followed by a data or command name;
resolve the keyword/name pairs in the IoT communication string to determine which IoT device is specified by the names in the IoT communication string and which data or command is specified in the IoT communication string; and
communicate, via the one or more network ports, with the specified IoT device to request the specified data from the specified IoT device or to send the specified command to the specified IoT device.

14. The IoT gateway device of claim 13, wherein:
the one or more network ports and the one or more processors are further configured to distribute communications over an overlay network.

15. The IoT gateway device of claim 13, wherein the one or more processors are further configured to:
discover the IoT devices coupled to the one or more network ports; and
add the discovered IoT devices to a forwarding table for use in accessing or communicating with the IoT devices.

16. The IoT gateway device of claim 13, wherein the IoT communication string excludes an Internet Protocol (IP) address or a domain name as the unique identifier for any of the IoT devices.

17. The IoT gateway device of claim 13, wherein the IoT communication string further includes an identifier that identifies the IoT communication string as a communication string configured for communication with the IoT devices.

18. The IoT gateway device of claim 17, wherein the identifier comprises an "iot://" label.

19. The IoT gateway device of claim 13, wherein:
the device keyword is a "devices" label or the user keyword is a "users" label;
the location keyword is a "loc" label or the time keyword is a "time" label; and
the data keyword is a "data" keyword or the command keyword is a "commands" label.

20. The IoT gateway device of claim 13, wherein:
the IoT communication string includes the user keyword followed by the user name;
the one or more processors are further configured to identify the user that corresponds to the user name; and
the one or more processors are further configured, prior to the communicating, determine that the identified user is authorized to request the specified data from the specified IoT device or to send the specified command to the specified IoT device.

* * * * *